United States Patent
Yamamoto

(10) Patent No.: US 7,580,626 B2
(45) Date of Patent: Aug. 25, 2009

(54) IMAGE PICKUP TERMINAL

(75) Inventor: Kazuhiro Yamamoto, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 12/169,444

(22) Filed: Jul. 8, 2008

(65) Prior Publication Data

US 2008/0273871 A1 Nov. 6, 2008

Related U.S. Application Data

(62) Division of application No. 11/318,094, filed on Dec. 23, 2005.

(30) Foreign Application Priority Data

Dec. 27, 2004 (JP) ............................. 2004-377867
Dec. 27, 2004 (JP) ............................. 2004-377868

(51) Int. Cl.
*G03B 17/18* (2006.01)
*H04N 5/228* (2006.01)

(52) U.S. Cl. .................. 396/283; 348/208.15

(58) Field of Classification Search ................ 396/283, 396/312; 348/208.15, 231.3, 231.4
See application file for complete search history.

(56) References Cited

U.S. PATENT DOCUMENTS

2006/0062563 A1 3/2006 Yoon
2008/0273870 A1* 11/2008 Yamamoto .................. 396/283

FOREIGN PATENT DOCUMENTS

| EP | 1 392 045 | 2/2004 |
| EP | 1 608 154 | 12/2005 |
| EP | 1 638 304 | 3/2006 |
| JP | 2001-186393 | 7/2001 |
| JP | 2003-338956 | 11/2003 |
| JP | 2004-163563 | 6/2004 |
| KR | 1020060026127 | 3/2006 |
| WO | 2004/080065 | 9/2004 |

\* cited by examiner

*Primary Examiner*—Rodney E Fuller
(74) *Attorney, Agent, or Firm*—Hogan & Hartson LLP

(57) ABSTRACT

An image pickup terminal includes an image pickup section, a data storage section which stores shutter sound setup data that sets a shutter sound generating when the image pickup section performs an imaging, a shutter sound generating section which generates a shutter sound based on the shutter sound setup data stored in the data storage section, a shutter sound appropriateness checking section which determines whether a shutter sound based on the shutter sound setup data stored in the data storage section is appropriate or not, and a control section which inhibits data setting of a shutter sound determined as being inappropriate by the shutter sound appropriateness checking section.

4 Claims, 13 Drawing Sheets

SOUND DATA FOR WHICH SOUND WAS GENERATED IN VOLUME OF 65 dB OR HIGHER FOR 0.2 sec OR LONGER BEFORE ELAPSE OF 0.5 sec FROM SOUND START (IMAGING)

SOUND DATA FOR WHICH SOUND IN VOLUME OF 65 dB OR HIGHER WAS NOT GENERATED

SOUND DATA FOR WHICH SOUND WAS GENERATED IN VOLUME OF 65 dB OR HIGHER FOR 0.2 sec OR LONGER AFTER ELAPSE OF 0.5 sec FROM SOUND START (IMAGING)

SOUND DATA FOR WHICH SOUND WAS GENERATED IN VOLUME OF 65 dB OR HIGHER FOR SHORTER THAN 0.2 sec BEFORE ELAPSE OF 0.5 sec FROM SOUND START (IMAGING)

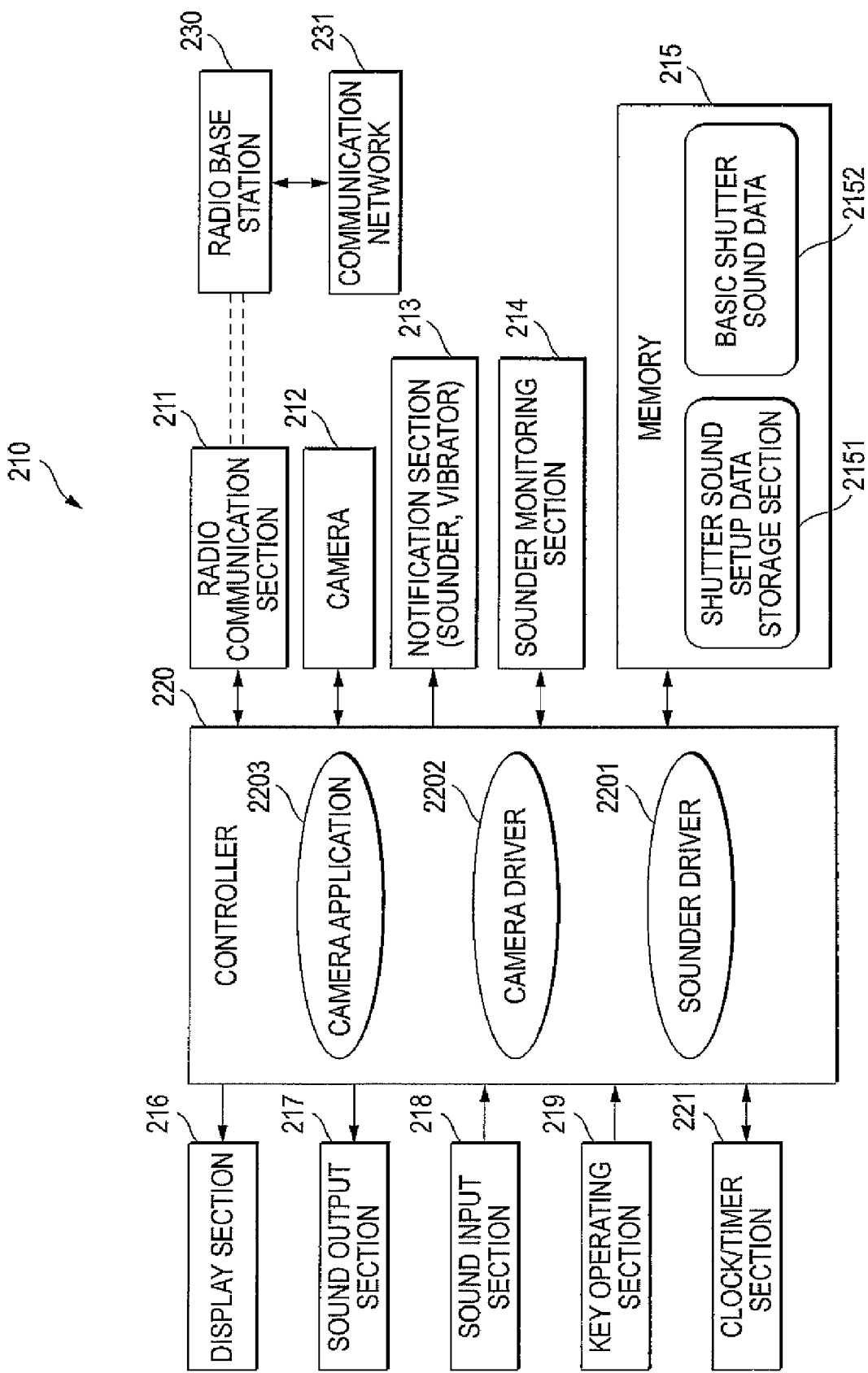

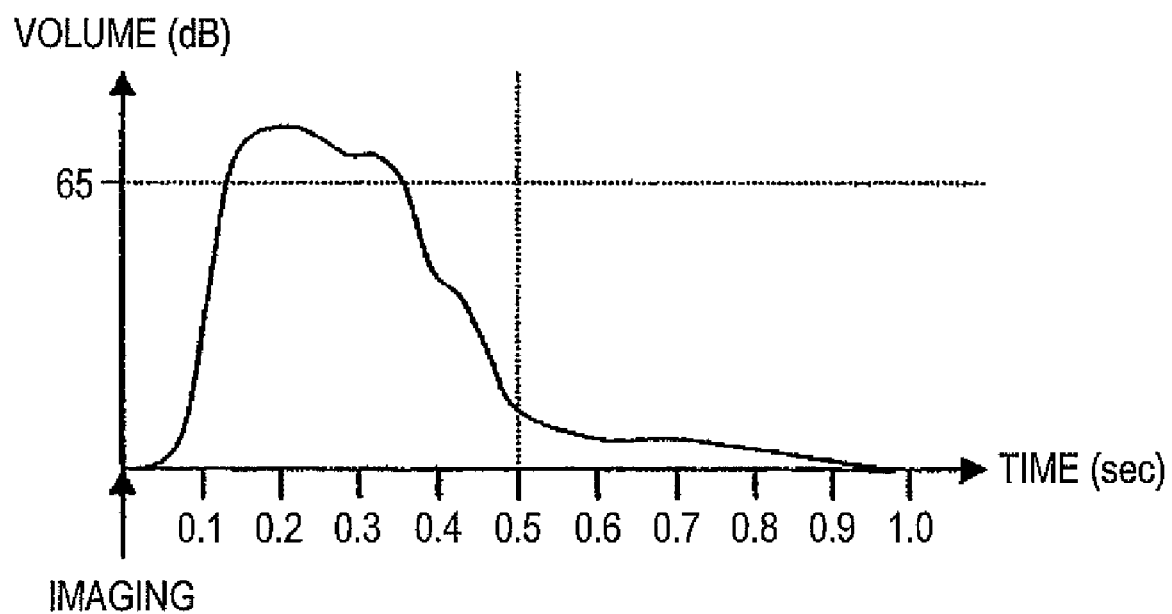

CASE WHEREIN SOUND IN 65 dB OR HIGHER WAS NOT
GENERATED WITHIN 0.5 sec OF MONITORING (IMAGING) START CASE WHEREIN SOUND IN 65 dB OR HIGHER WAS GENERATED
FOR LESS THAN 0.2 sec WITHIN 0.5 sec OF MONITORING
(IMAGING) START

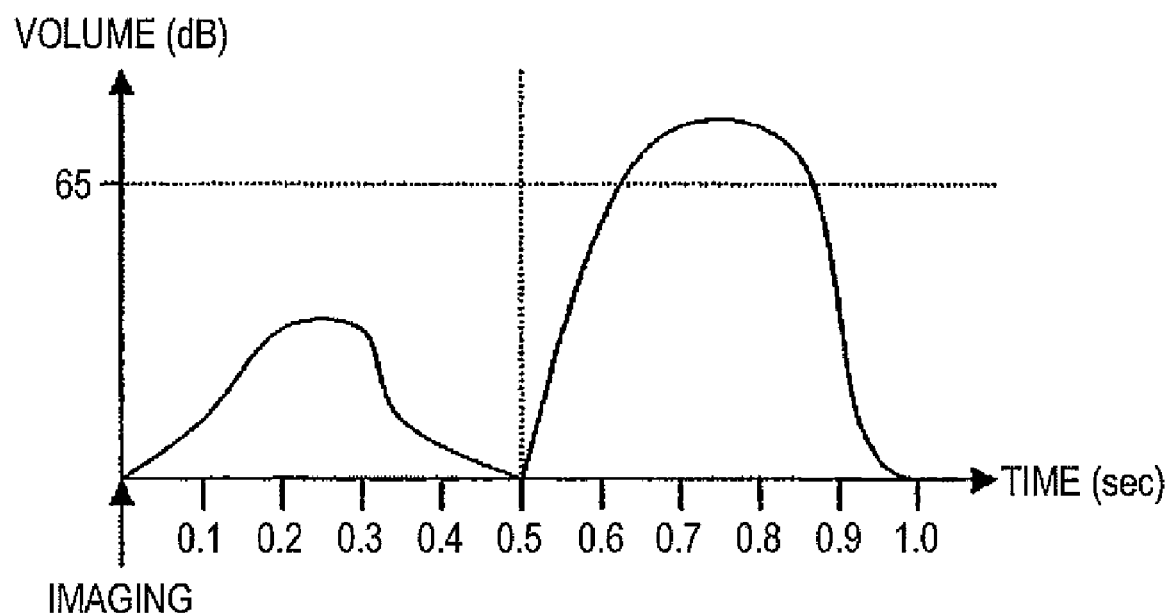

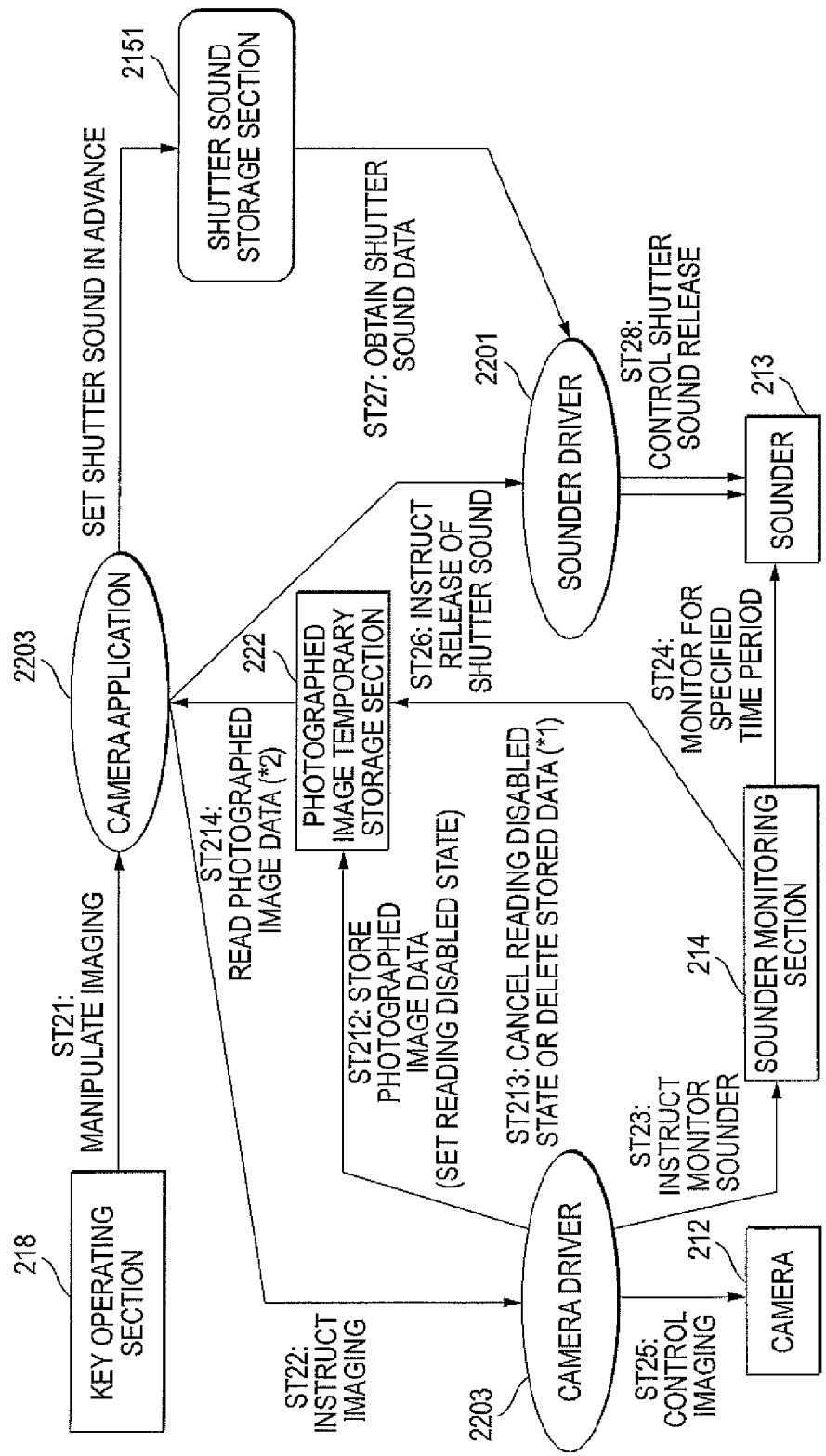

IMAGE PICKUP TERMINAL

CROSS-REFERENCE TO RELATED APPLICATIONS

This application is a divisional of application Ser. No. 11/318,094 filed Dec. 23, 2005, the entire contents of which are incorporated herein by reference. Also this application is based upon and claims benefit of priority under 35 U.S.C. 0 119 from the prior Japanese Patent Applications No. 2004-377867 filed on Dec. 27, 2004, and No. 2004-377868 filed on Dec. 27, 2004, the entire contents of which are incorporated herein by reference.

BACKGROUND OF THE INVENTION

1. Field of the Invention

The present invention relates to an image pickup terminal, such as a cellular phone equipped with a camera, which enables to install, set or rewrite an application for setting shutter sounds or shutter sound data.

2. Description of the Related Art

Recently, there has been a surge in the popularity of camera equipped portable terminals, e.g., cellular phones having internally mounted image pickup devices, including digital cameras, and the use of portable terminal mounted cameras for surreptitious photography practices has spread and has become a social problem.

Thus, to resolve this problem, it is common for a cellular phone having an internally mounted camera to provide aural notification within a surrounding area of imaging in that vicinity, by emitting an appropriately high volume sound when the shutter of the camera is generated, regardless of the setting of a manner mode, for example. This is also a designated carrier specification for cellular phones.

Further, data for a shutter release sound for imaging is selectable at a setup stage. But at the present, the shutter sound choices are fixed, so that presently, only predesignated sound data can be selected by a user.

Therefore, regardless of which sound data a user selects, a shutter sound having a satisfactory volume is always emitted when an image is picked up, so that notification can be provided for a surrounding area that the user is imaging in that vicinity.

The use has also spread of portable terminals mounting platforms such as BREW, iαappli, Vappli, Microsoft Smartphone, Linux and Symbian that permit users, in accordance with their tastes, to install various additional application software products.

Thus, additional application software for controlling the camera function can be used in accordance with the judgements of the users.

As example apparatuses constituted so as to release a shutter sound at the time an image is picked up, the following first to seventh apparatuses have been proposed.

The first apparatus is an image pickup terminal, such as an electronic still camera that normally releases a mechanical shutter sound that is not, or is only faintly, audible, for which sound is used to output an imaging start and end time that enables a user to apprehend the shutter time by intuition (see, for example, JP-A-2003-338956).

The second apparatus is a cellular phone that can use, as a shutter sound, sound data obtained from a server via a network.

The third apparatus is a recording/reproduction apparatus that can rewrite, using a memory card, a camera control program that includes data for a shutter sound.

The fourth apparatus is a digital camera that can download shutter sound data from a server and change the setup.

The fifth apparatus is a portable terminal that can download an accessory application from a network.

The sixth apparatus is a system that supports, by remote control, an electronic device, such as a digital camera, and provides a digital camera diagnosis application via a network.

The seventh apparatus is a cellular phone that can provide applications, for example, via a network.

JP-A-2003-338956 is referred to as a related art.

It is predicted that the above described sound data for shutter sounds will probably be available to users via the Internet, or an external device, for employment as added sound choices.

In this case, the possibility exists that a user will choose to select and set sound data that are inappropriate for the intended purpose of providing notification within a surrounding area that the user is imaging in that vicinity.

Furthermore, a camera-mounted portable terminal, on which one of the above described platforms is mounted, may be employed by additionally installing camera application software that does not emit a shutter sound during an imaging process, or that can be used for a setup to prevent the emission of a shutter sound.

SUMMARY OF THE INVENTION

An object of the invention is to provide an image pickup terminal that generates a shutter sound having an adequately high volume whenever an imaging is performed, so that it can provide notification in an imaged area, and it can inhibit a picked-up image data from being abused.

The invention provides an image pickup terminal, having: an image pickup section; a data storage section which stores shutter sound setup data that sets a shutter sound generating when the image pickup section performs an imaging; a shutter sound appropriateness checking section which performs a shutter sound appropriateness check to determine whether a shutter sound based on the shutter sound setup data stored in the data storage section is appropriate or not; and a control section which inhibits a setting of a shutter sound checked as being inappropriate by the shutter sound appropriateness checking section.

The invention also provides an image pickup terminal, having: an image pickup section; a data storage section which stores shutter sound setup data that sets a shutter sound generating when the image pickup section performs an imaging; a shutter sound appropriateness checking section which checks whether a shutter sound based on the shutter sound setup data stored in the data storage section is appropriate or not; and a control section which rewrites the shutter sound setup data to generate an appropriate shutter sound when the shutter sound appropriateness checking section checks the shutter sound data stored in the data storage section as being inappropriate.

The invention also provides an image pickup terminal having: an image pickup section; a data storage section which stores shutter sound setup data that sets a shutter sound generating when the image pickup section performs an imaging; a shutter sound generating section which generates a shutter sound based on the shutter sound setup data stored in the data storage section; an image pickup driver which controls the image pickup section; a shutter sound driver which controls the shutter sound generating section; and a control section which does instruct the shutter sound driver so that the shutter sound generating section generates a shutter sound based on the shutter sound setup data stored in the data storage section when the image pickup driver receives an imaging instruction.

In the image pickup terminal, the shutter sound appropriateness checking section checks an appropriateness of a new shutter sound before the shutter sound setup data stored in the data storage section is rewritten, and the control section rewrites the shutter sound setup data stored in the data storage section, when the shutter sound appropriateness checking section determines as being appropriate, and the control section does not rewrite the shutter sound setup data stored in the data storage section, when the shutter sound appropriateness checking section determines as being inappropriate.

In the image pickup terminal, the shutter sound appropriateness checking section performs the shutter sound appropriateness check when an imaging instruction is issued, and the image pickup section performs an imaging, when the shutter sound appropriateness checking section determines as being appropriate, and the image pickup section performs an imaging after a basic shutter sound data is set, when the shutter sound appropriateness checking section determines as being inappropriate.

In the image pickup terminal, the shutter sound appropriateness checking section performs the shutter sound appropriateness check when a shutter sound generating instruction is issued, and the shutter sound generating section generates the shutter sound based on the shutter sound setup data stored in the data storage section, when the shutter sound appropriateness checking section determines as being appropriate, and the shutter sound generating section generates a basic shutter sound after a basic shutter sound data is set in the data storage section, when the shutter sound appropriateness checking section determines as being inappropriate.

According to the image pickup terminal, when an image is picked up, a shutter sound having an adequately high volume is always generated, so that notification is provided in an imaging area.

The invention also provides an image pickup terminal, having: an image pickup section; a data storage section which stores shutter sound setup data that sets a shutter sound generating when the image pickup section performs an imaging; a shutter sound generating section which generates a shutter sound based on the shutter sound setup data stored in the data storage section; a shutter sound appropriateness checking section which checks whether a shutter sound based on the shutter sound setup data stored in the data storage section is appropriate or not; and a control section which controls the shutter sound generating section to generate the shutter sound based on the shutter sound setup data stored in the data storage section when the image pickup section performs an imaging, wherein, when a shutter sound generated from the shutter sound generating section is inappropriate, the control section controls the shutter sound generating section to generate an appropriate shutter sound subsequently.

The invention also provides an image pickup terminal having: an image pickup section; a data storage section which stores shutter sound setup data that sets a shutter sound generating when the image pickup section performs an imaging; a shutter sound generating section which generates a shutter sound based on the shutter sound setup data stored in the data storage section; an image pickup driver which controls the image pickup section; a shutter sound driver which controls the shutter sound generating section; and a control section which does instruct the shutter sound driver so that the shutter sound generating section generates a shutter sound based on the shutter sound setup data stored in the data storage section when the image pickup driver receives an imaging instruction.

In the image pickup terminal, the shutter sound appropriateness checking section determines a shutter sound as being appropriate when the shutter sound generates in predetermined volume or higher for a predetermined period of time or more within a specific period of time following the imaging start.

In the image pickup terminal, the data storage section includes: a shutter sound setup data storage section which stores the shutter sound setup data; and a basic shutter sound data storage section which stores a basic shutter sound, wherein the shutter sound generator generates a shutter sound based on the basic shutter sound data stored in the basic shutter sound data storage section, when the shutter sound appropriateness checking section determines as being inappropriate.

The invention also provides an image pickup terminal, having: an image pickup section; a data storage section which stores shutter sound setup data that sets a shutter sound generating when the image pickup section performs an imaging; a shutter sound generating section which generates a shutter sound based on the shutter sound setup data stored in the data storage section; a shutter sound appropriateness checking section which checks whether a shutter sound based on the shutter sound setup data stored in the data storage section is appropriate or not; a storage section which temporarily stores image data of an image picked up by the image pickup section; and a control section which controls the shutter sound generating section to generate the shutter sound based on the shutter sound setup data stored in the data storage section when the image pickup section performs an imaging, wherein the control section inhibits the image data stored in the storage section from being read when a shutter sound generated from the shutter sound generating section is inappropriate.

In the image pickup terminal, the control section deletes the image data stored in the storage section when the shutter sound generated from the shutter sound generating section is inappropriate.

In the image pickup terminal, the shutter sound appropriateness checking section includes, at the least either a section which detects volume of a shutter sound generated from the shutter sound generating section with using a microphone, or a section which detects amplitude of a digital signal or an analog signal related to the shutter sound generated from the shutter sound generating section.

In the image pickup terminal, the shutter sound appropriateness checking section determines a shutter sound as being appropriate when the shutter sound generates in predetermined volume or higher for a predetermined period of time or more within a specific period of time following the imaging start.

According to the image pickup terminal, when an image is picked up, a shutter sound having an adequately high volume is always generated, so that a picked-up image data obtained by imaging is inhibited from being abused because illegal use of image data obtained by imaging can be prevented.

BRIEF DESCRIPTION OF THE DRAWINGS

FIG. 9 is a diagram showing the configuration of a cellular phone that employs an image pickup terminal according to a second embodiment of the present invention;

FIG. 10 is a graph showing an example waveform for a case wherein a shutter sound was generated by a sounder at an adequately high volume;

FIG. 12 is a graph showing an example waveform for a case wherein because a shutter sound was not generated by the sounder at an adequately high volume, a basic shutter sound was therefore also generated;

FIG. 15 is diagram for explaining the operation of the image pickup terminal shown in FIG. 14.

DETAILED DESCRIPTION OF THE PREFERRED EMBODIMENTS

Figure 1:
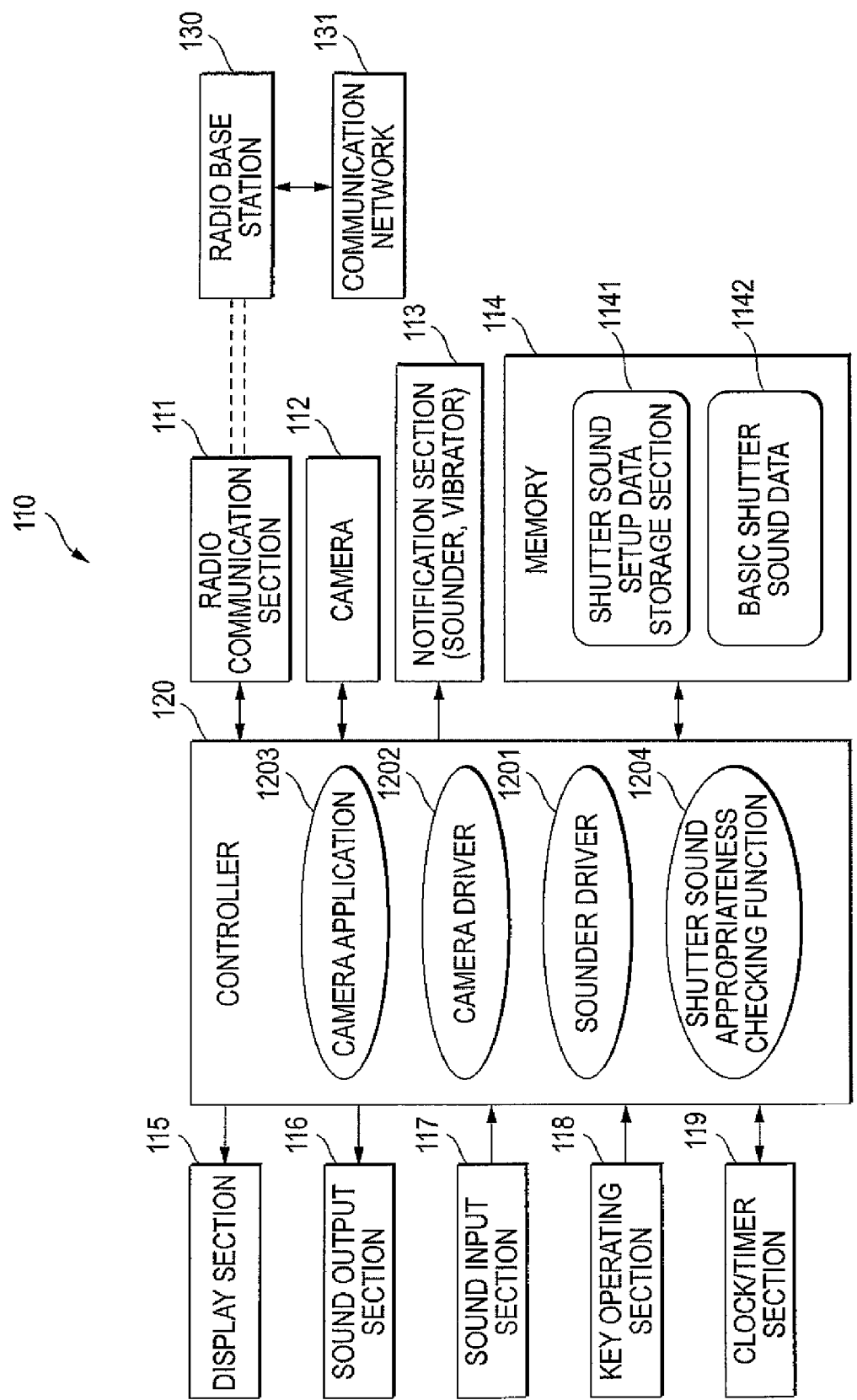
FIG. 1 is a diagram showing the configuration of a cellular phone that employs an image pickup terminal according to a first embodiment of the present invention.

Embodiments of the present invention will now be described while referring to the drawings.

First Embodiment

FIG. 1 is a diagram showing the configuration of a cellular phone that employs an image pickup terminal according to a first embodiment of the invention.

As shown in FIG. 1, a cellular phone 110 includes a radio communication section 111, an image pickup section (a camera) 112, a notification section (a sounder) 113, a memory 114, a display section 115, a sound output section 116, a sound input section 117, a key operating section 118, a clock/timer 119, and a controller 120.

In FIG. 1, reference numeral 130 denotes a radio base station, and reference numeral 131 denotes a communication network.

In order to communicate using radio waves, the radio communication section 111 modulates various information, such as image data, sound information and electronic mail processed by the controller 120, and transmits these data, via a transmission/reception antenna (not shown), to the communication network 131 that includes the radio base station 130.

Further, the radio communication section 111 receives, via the transmission/reception antenna (not shown), a variety of information, such as image data, sound information and electronic mail that is transmitted by a server (not shown) across the communication network 131, demodulates all received data, and transmits the demodulated data to the controller 120.

The image pickup section (a camera) 112 includes an optical system including an object lens for obtaining an image of an object, and an image pickup processing circuit including an image pickup element for converting the image of the object obtained by the optical system into an electric signal. When an imaging key arranged on the key operating section 118 is manipulated, the optical image of the object is picked up by the optical system.

The image pickup processing circuit converts, into an electric signal, the optical image of the object formed by the optical system.

Specifically, in the image pickup processing circuit, the image of the object is received by multiple light-receiving elements that are arranged, as pixel sections, on the two-dimensional plane of the image pickup element. At this time, color information is obtained through the color filters of the light-receiving elements, whereby it is separated into data for the three primary colors (R, G and B).

The image pickup processing circuit converts the luminance levels of the individual pixels into voltages, and an analog/digital (A/D) converter sequentially converts the voltages into digital data that it transmits to the controller 120.

A CCD or a CMOS sensor, for example, is employed as the image pickup element.

In accordance with an instruction issued by the controller 120, the notification section (the sounder) 113 generates a shutter sound in accordance with the shutter sound setup data or the basic shutter sound data.

The notification section (the sounder) 113 is constituted, for example, by a sounder or a vibrator.

The memory 114, which is accessed by the controller 120, includes a shutter sound setup data storage section 1141 for storing shutter sound setup data that can be set by an application that sets a shutter sound or in accordance with data for a shutter sound, and a basic shutter sound data storage section 1142 for storing basic shutter sound data prepared as data for default shutter sound data.

The memory 114 also includes a nonvolatile memory, an EEPROM, in which image data obtained and compressed by the image pickup section (the camera) 112 are stored.

The display section 115 includes a display device, such as a liquid crystal display device controlled by the controller 120, and displays telephone numbers, a variety of messages and text data entered to perform a communication function.

The display section 115 also displays the image of an object obtained by the image pickup section (camera) 112.

The sound output section 116 performs predetermined processing for sound information received from the controller 120, and outputs sound at a loudspeaker.

The sound input section 117 performs predetermined processing for sound collected using a microphone, and transmits the obtained sound information to the controller 120.

The key operating section 118 includes an end (end communication)/power key, a start (call) key, ten key pad, for corresponding numbers, and an imaging key, and when these keys are manipulated by a user, information entered by the user is transmitted to the controller 120.

The controller 120, constituted mainly by a micro computer, controls the entire cellular phone 110 that serves as an image pickup terminal.

The controller 120 provides, for example, control of the radio transmission/reception of a variety of information by the radio communication section 111, of the processing of sound information for the sound output section 116 and the sound input section 117, of the display of information on the display section 115, of the processing performed in consonance with information entered at the key operating section 118, and of access relative to the memory 114.

The controller 120 has a function for employing the determination obtained by a shutter sound appropriateness checking function 1204 to inhibit the setup of shutter sound setup data based on an application that sets a shutter sound or data for a shutter sound.

The controller 120 includes a sounder (a shutter sound) driver 1201 for controlling the sounder 113, a camera (photography) driver 1202, a camera (photography) application 1203 for issuing an instruction to the camera driver 1202 and the sounder (the shutter sound) driver 1201, and a forcible shutter sound generation application for detecting whether the camera (photography) application 1203 has issued an imaging instruction to the camera driver 1202 and for issuing a shutter sound instruction to the sounder (the shutter sound) driver 1201.

The controller 120 also includes the shutter sound appropriateness checking function 1204 for performing one of the following processes to release an appropriate shutter sound and provide notification for a surrounding area of imaging in that vicinity.

Process 1: Before the shutter sound setup data stored in the shutter sound data storage section 1141 is rewritten, the appropriateness of sound data is examined by the shutter sound appropriateness checking function 1204. When it is determined that the sound data are not appropriate, rewriting of the shutter sound data storage section 1141 is disabled and an appropriate setup for a shutter sound is maintained.

Process 2: Immediately before the imaging process is performed, the appropriateness of the setup data in the shutter sound setup data storage section 1141 is examined by the shutter sound appropriateness checking function 1204. When it is determined that the setup data are not appropriate, the basic shutter sound data in the basic shutter sound data storage section 1142 in the memory 114 is set in the shutter sound setup data storage section 1141, and imaging is initiated.

More specifically, when the rewriting of the shutter sound setup data in the shutter sound setup data storage section 1141 is requested, the controller 120 employs the shutter sound appropriateness checking function 1204 to examine the appropriateness of new sound data for a shutter sound that is to be set. When the controller 120 determines that the new sound data are appropriate, the controller 120 rewrites the data in the shutter sound setup data storage section 1141. When, however, the controller 120 determines that the sound data are not appropriate, the controller 120 does not rewrite the data.

Further, when an imaging instruction is issued to the camera driver 1202, the controller 120 employs the shutter sound appropriateness checking function 1204 to examine for appropriateness sound data, for a shutter sound, that currently are set in the shutter sound data setup storage section 1141. When the controller 120 determines that the current sound data are appropriate, the imaging process is initiated. When, however, the controller 120 determines that the current sound data are not appropriate, the current setup data in the shutter sound setup storage section 1141 are overwritten with the basic shutter sound data, and the imaging process is initiated.

When a shutter sound release instruction is issued to the sounder driver 1201, the controller 120 employs the shutter sound appropriateness checking function 1204 to examine for appropriateness sound data, for a shutter sound, that are currently set in the shutter sound setup data storage section 1141. When the controller 120 determines that the current sound data are appropriate, a set shutter sound is generated. When, however, the controller 120 determines that the current sound data are not appropriate, the setup data in the shutter sound setup data storage section 1141 are overwritten with to the basic shutter sound data, and a shutter sound is generated.

When an imaging instruction is issued to the camera driver 1202, the controller 120 permits the camera driver 1202 to issue a shutter sound release instruction to the sounder driver 1201.

Then, the controller 120 accesses the memory 114 to read the shutter sound setup data, and outputs this data to the sounder 113.

In this embodiment, the shutter sound appropriateness checking function 1204 employs the following determination references as examples.

When a sound has a frequency falling within the audible range, and when generated has a volume of 65 dB or higher and is emitted for 0.2 seconds or longer within a 0.5 second period following the start of monitoring (imaging), the sound is determined to be "appropriate".

Figure 2:
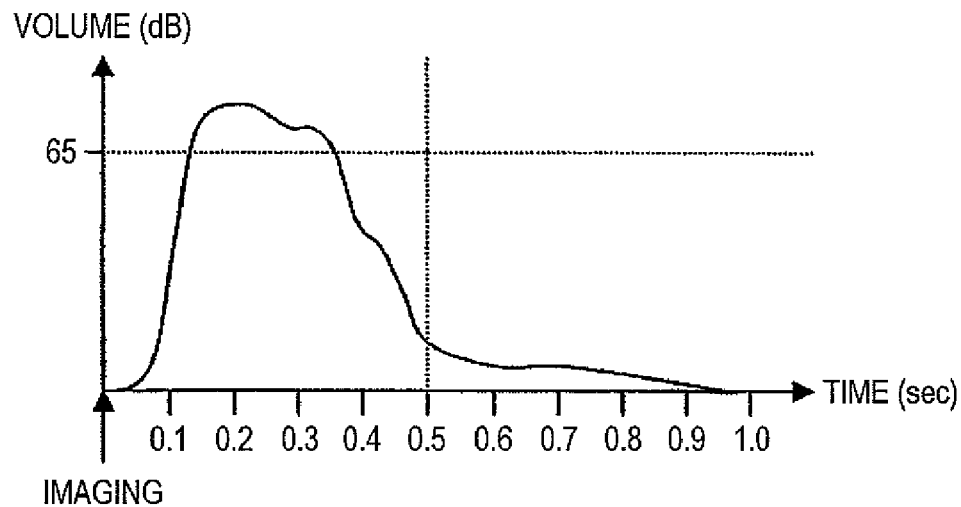
FIG. 2 is a graph showing an example waveform for a case wherein a shutter sound was generated by a sounder at an adequately high volume.

FIG. 2 is a graph showing an example waveform for a case wherein a shutter sound was generated by the sounder at an adequately high volume.

Figure 3:
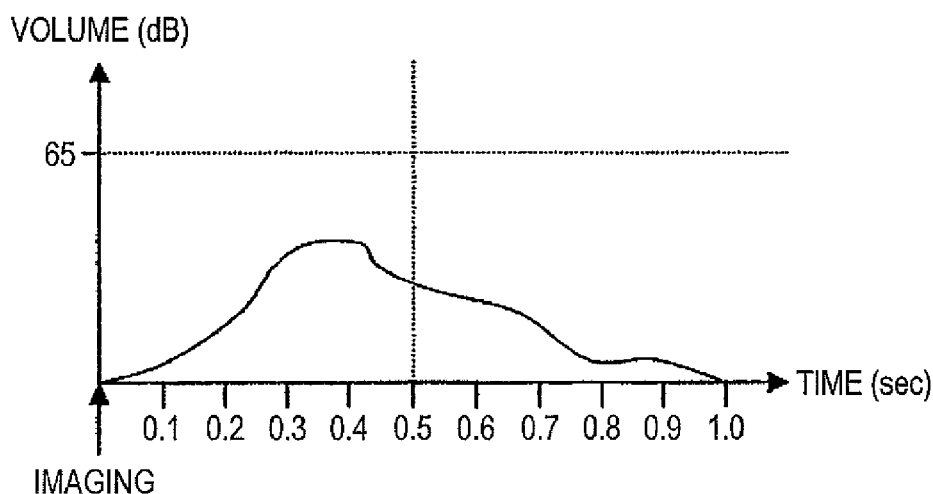
FIG. 3 is a graph showing an example first waveform for a case wherein a shutter sound was not generated by the sounder at an adequately high volume.

FIG. 3 is a graph showing a first example waveform for a case wherein a shutter sound was not generated by the sounder at an adequately high volume.

In the example in FIG. 3, a volume of 65 dB or higher did not appear within 0.5 seconds of the start of monitoring (imaging).

Figure 4:
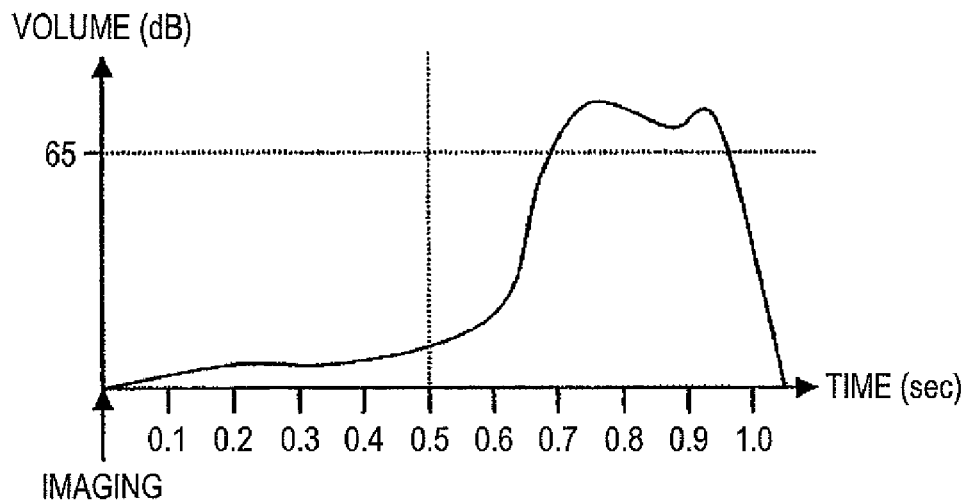
FIG. 4 is a graph showing an example second waveform for a case wherein a shutter sound was generated too late by the sounder, but at an adequately high volume.

FIG. 4 is a graph showing a second example waveform for a case wherein a shutter sound was generated late by the sounder.

In the example in FIG. 4, a sound was not generated at a volume of 65 dB or higher for 0.2 seconds or longer until after 0.5 seconds had elapsed following the start of monitoring (imaging).

Figure 5:
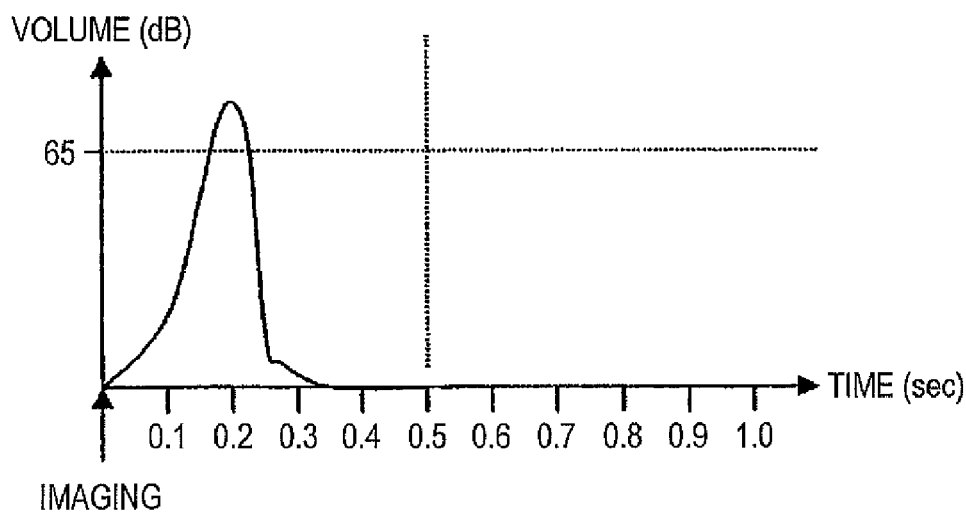
FIG. 5 is a graph showing an example third waveform for a case wherein a shutter sound was too short, but was generated by the sounder at an adequately high volume.

FIG. 5 is a graph showing a third example waveform for a case wherein the time that a shutter sound was generated by the sounder was inadequate.

In the example in FIG. 5, before 0.5 seconds had elapsed since the start of monitoring (imaging), the sound was generated at a volume of 65 dB or higher for less than 0.2 seconds.

Figure 6:
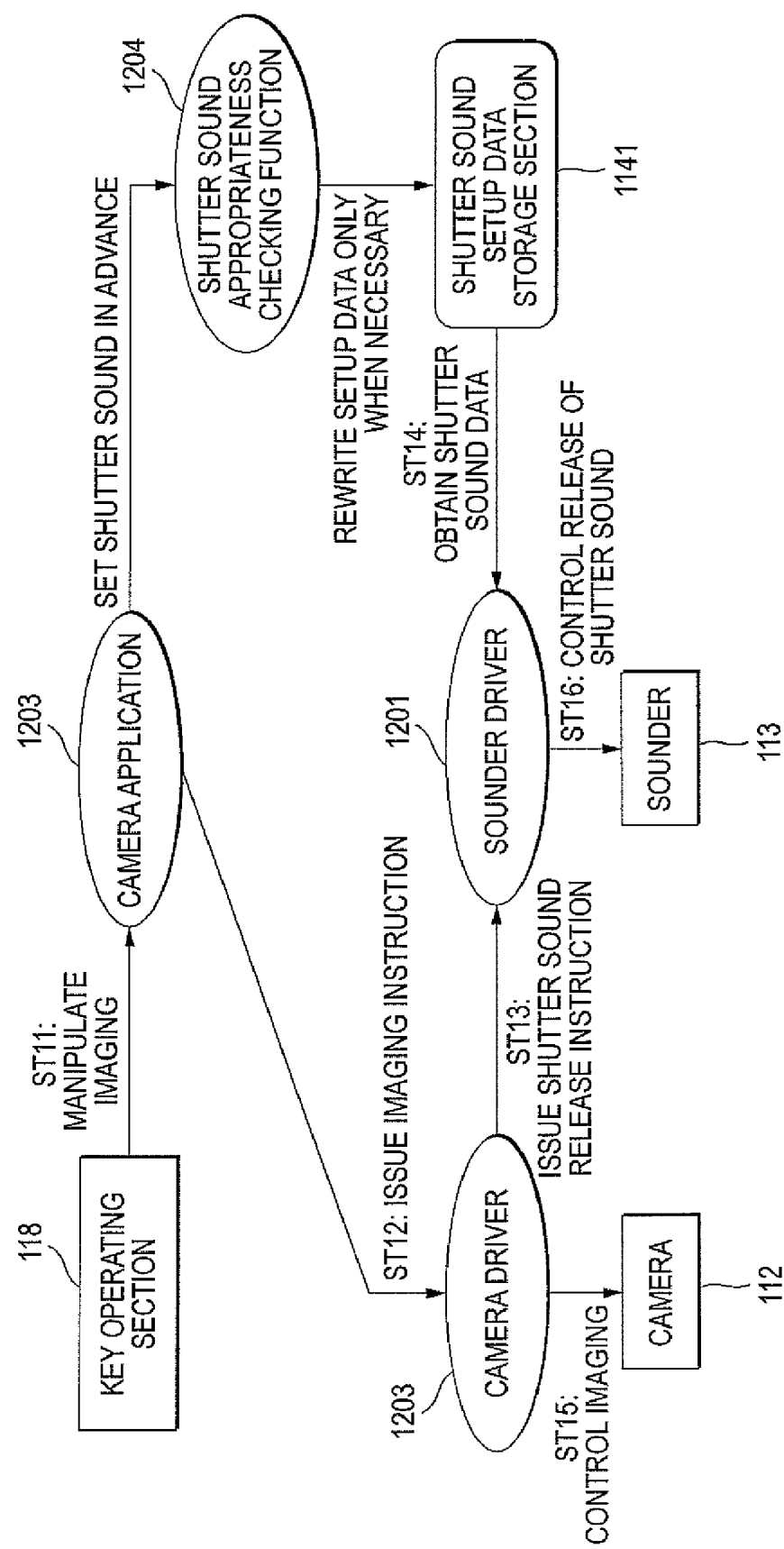
FIG. 6 is a diagram for explaining a first operation performed by the image pickup terminal shown in FIG. 1.
Figure 7:
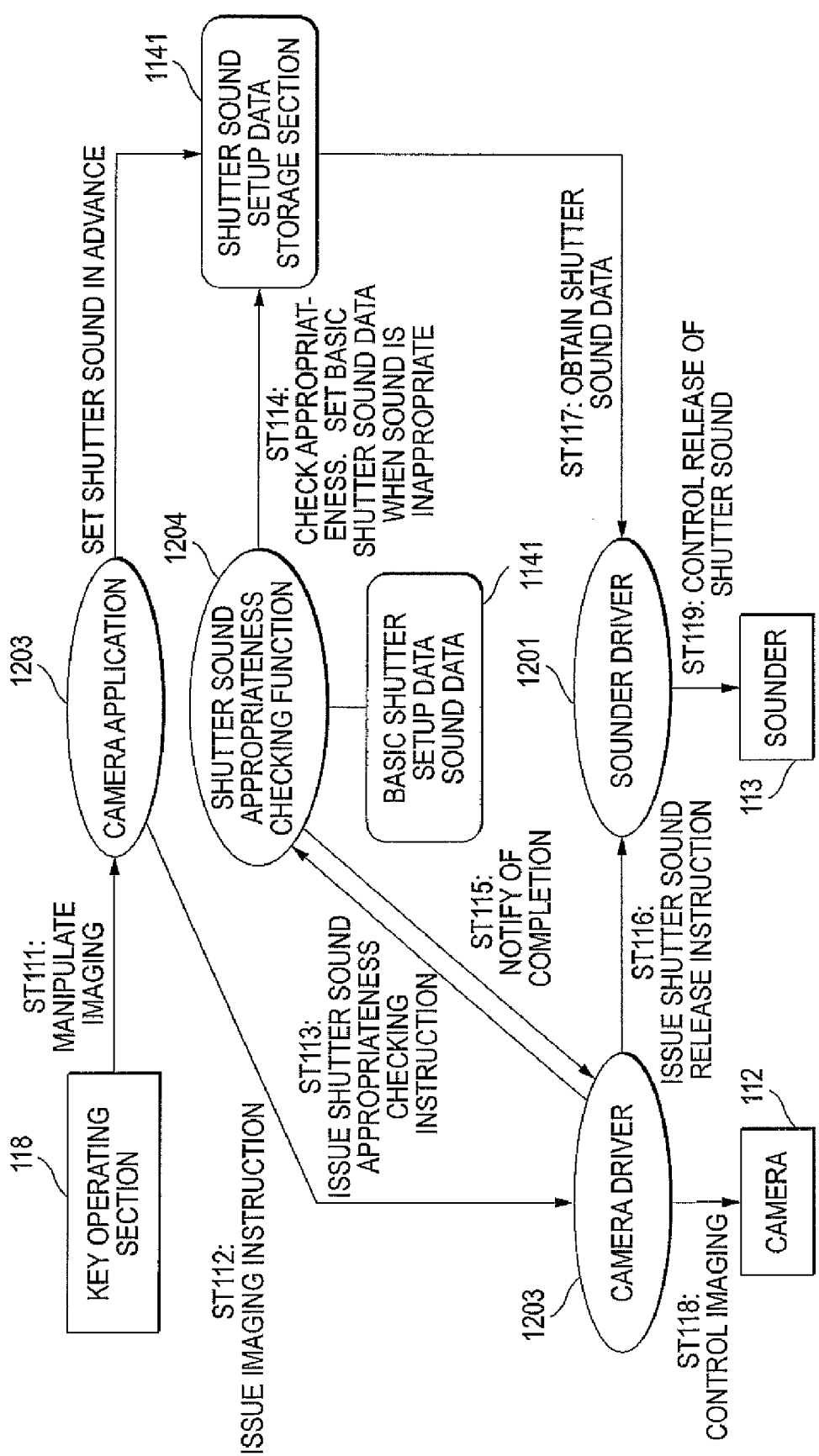
FIG. 7 is a diagram for explaining a second operation performed by the image pickup terminal shown in FIG. 1.
Figure 8:
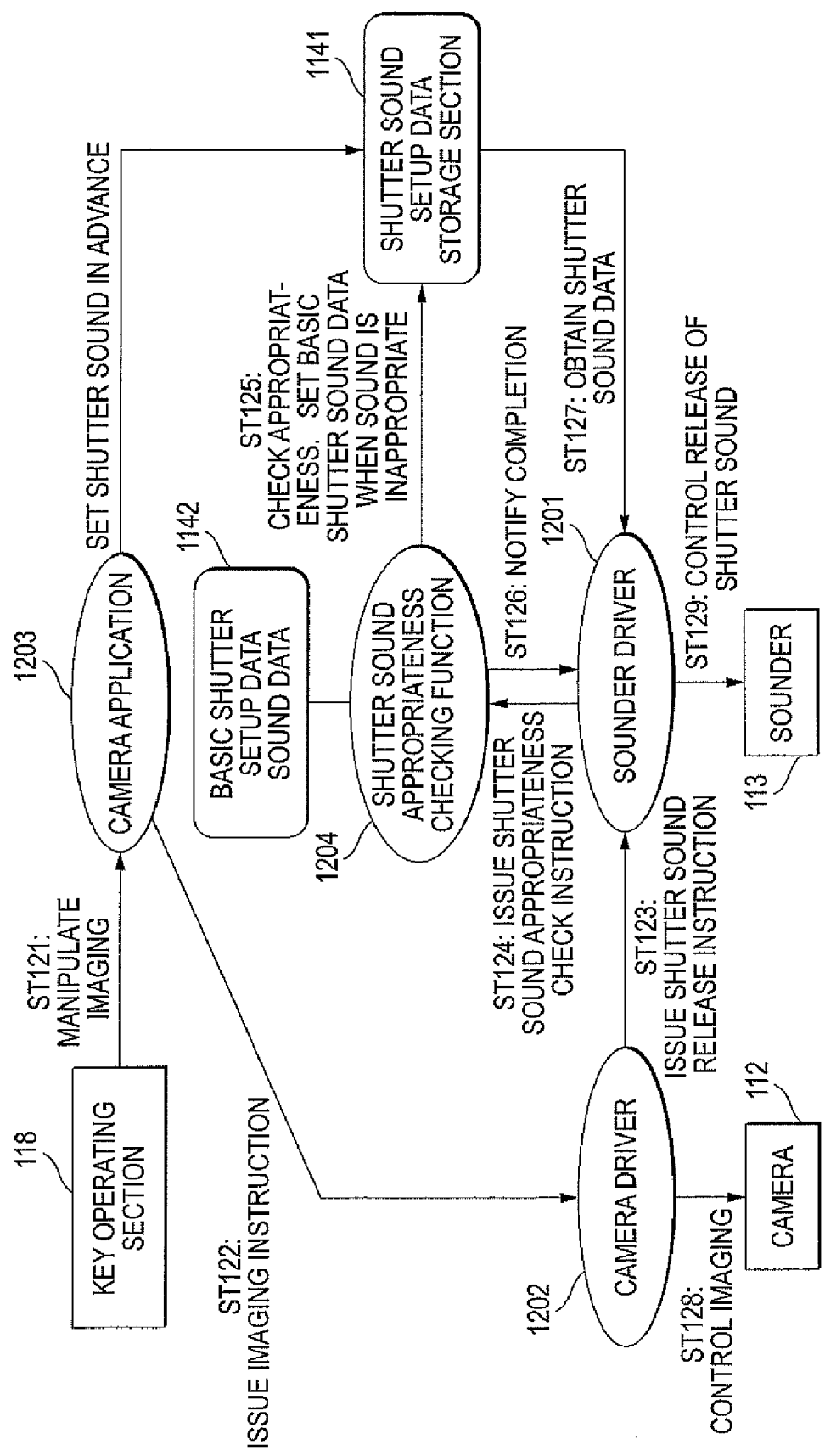
FIG. 8 is a diagram for explaining a third operation performed by the image pickup terminal shown in FIG. 1.

First, second and third operation patterns for the cellular phone 110 shown in FIG. 1 will now be described in association with FIGS. 6, 7 and 8.

The first operation pattern will be described in association with FIG. 6.

When the imaging key of the key operating section 118 of the cellular phone 110 in FIG. 1 is manipulated (ST11) and an imaging instruction is transmitted to the camera driver 1202 via the camera application 1203 of the controller 120 (ST12), the camera driver 1202 issues a shutter sound release instruction to the sounder driver 1201 (ST13).

The shutter sound appropriateness checking function 1204 is employed, concurrently, to examine the appropriateness of new sound data for a set shutter sound. And when it is determined that the new sound data are appropriate, rewriting of the data in the shutter sound setup data storage section 1141 is permitted and performed when, however, it is determined that the new sound data are not appropriate, rewriting using that data is neither permitted nor performed, and the sounder driver 1201 obtains other shutter sound data (ST14).

The camera driver 1202 performs the imaging processing for the camera (the image pickup section) 112 (ST5).

Further, since it has previously been determined, through checking performed by the shutter sound appropriateness checking function 1204, that appropriate shutter sound setup data are available in storage, the sounder driver 1201 can always execute the sound release control for the sounder 113 in accordance with appropriate shutter sound data (ST16).

The second operation pattern will now be explained in association with FIG. 7.

When the imaging key of the key operating section 118 of the cellular phone 110 in FIG. 1 is manipulated (ST111) and an imaging instruction is transmitted to the camera driver 1202 through the camera application 1203 of the controller 120 (ST112), a shutter sound appropriateness checking instruction is issued by the camera driver 1202 to the sounder sound appropriateness checking function 1204 (ST113).

Upon receiving this instruction, the shutter sound appropriateness checking function 1204 examines for appropriateness sound data for a shutter sound that are currently set in the shutter sound setup data storage section 1141. When it is determined that the current sound data are appropriate, imaging is initiated. When, however, it is determined that the current sound data are not appropriate, the data in the shutter sound setup storage section 1141 are overwritten with basic shutter sound data (ST114).

A checking completion notification is transmitted by the shutter sound appropriateness checking function 1204 to the camera driver 1202 (ST115), and then, a shutter sound release instruction is issued by the camera driver 1202 to the sounder driver 1201 (ST116).

Also, shutter sound data are obtained by the sounder driver 1201 (ST117).

Thereafter, the camera driver 1202 executes the imaging control for the camera (image pickup section) 112 (ST118).

Further, the Sounder Driver 1201 Executes the Sound release control for the sounder 113 in accordance with shutter sound setup data (ST119).

The third operation pattern will now be explained in association with FIG. 8.

When the imaging key of the key operating section 118 of the cellular phone 110 in FIG. 1 is manipulated (ST121) and an imaging instruction is transmitted to the camera driver 1202 via the camera application 1203 of the controller 120 (ST122), a shutter sound release instruction is issued by the camera driver 1202 to the sounder driver 1201 (ST123).

Then, a shutter sound appropriateness checking instruction is issued by the sounder driver 1201 to the shutter sound appropriateness checking function 1204 (ST124).

Upon receiving this instruction, the shutter sound appropriateness checking function 1204 examines for appropriateness current sound data for a shutter sound that is set in the shutter sound setup data storage section 1141. When it is determined that the current sound data are appropriate, a shutter sound is generated. When, however, it is determined that the current sound data are not appropriate, the sound data currently set in the shutter sound setup data storage section 1141 are overwritten with basic shutter sound data (ST125).

Following this, a checking completion notification is transmitted by the shutter sound appropriateness checking function 1204 to the sounder driver 1201 (ST126), and the shutter sound data are obtained by the sounder driver 1201 (ST127).

Thereafter, the camera driver 1202 executes the imaging control for the camera (image pickup section) 112 (ST128).

Further, the sound driver 1201 executes the sound release control for the sounder 113 in accordance with the shutter sound setup data (ST129).

According to the embodiment, the cellular phone 110 includes the memory 114 which is used to store shutter sound setup data that can be set in accordance with an application for setting a shutter sound or shutter sound data, the notification section (the sounder) 113 which generates a shutter sound based on the shutter sound setup data stored in the memory 114, and the controller 120 which has the shutter sound appropriateness checking function 1204 for determining whether a shutter sound generated based on shutter sound data is in a predetermined volume or higher, and which employs the determination obtained by the shutter sound appropriateness checking function 1204 to inhibit the shutter sound setup data from being set. With this configuration, when an image is picked up, a shutter sound having an adequately high volume is always generated, so that notification can be provided in an imaging area.

Second Embodiment

FIG. 9 is a diagram showing the configuration of a cellular phone that employs an image pickup terminal according to a second embodiment of the invention.

As shown in FIG. 9, a cellular phone 210 includes a radio communication section 211, an image pickup section (a camera) 212, a notification section (a sounder) 213, a sounder monitoring section 214, a memory 215, a display section 216, a sound output section 217, a sound input section 218, a key operating section 219, a controller 220, and a clock/timer 221.

In FIG. 9, reference numeral 230 denotes a radio base station, and reference numeral 231 denotes a communication network.

In order to communicate using radio waves, the radio communication section 211 modulates various information, such as image data, sound information and electronic mail processed by the controller 220, and transmits these data, via a transmission/reception antenna (not shown), to the communication network 231 that includes the radio base station 230.

Further, the radio communication section 211 receives, via the transmission/reception antenna (not shown), a variety of information, such as image data, sound information and electronic mail that is transmitted by a server (not shown) across the communication network 231, demodulates all received data, and transmits the demodulated data to the controller 220.

The image pickup section (a camera) 212 includes an optical system including an object lens for obtaining an image of an object, and an image pickup processing circuit including an image pickup element for converting the image of the object obtained by the optical system into an electric signal. When an imaging key arranged on the key operating section 219 is manipulated, the optical image of the object is picked up by the optical system.

The image pickup processing circuit converts, into an electric signal, the optical image of the object formed by the optical system.

Specifically, in the image pickup processing circuit, the image of the object is received by multiple light-receiving elements that are arranged, as pixel sections, on the two-dimensional plane of the image pickup element. At this time, color information is obtained through the color filters of the light-receiving elements, whereby it is separated into data for the three primary colors (R, G and B).

The image pickup processing circuit converts the luminance levels of the individual pixels into voltages, and an analog/digital (A/D) converter sequentially converts the voltages into digital data that it transmits to the controller 220.

A CCD or a CMOS sensor, for example, is employed as the image pickup element.

In accordance with an instruction issued by the controller 220, the notification section (the sounder) 213 generates a shutter sound in accordance with the shutter sound setup data or the basic shutter sound data.

The notification section (the sounder) 213 is constituted, for example, by a sounder or a vibrator.

In accordance with an instruction transmitted by the controller 220, the sounder monitoring section (the shutter sound appropriateness checking function) 214 determines whether a shutter sound generated by the sounder (the notification section) 213 has a predetermined volume or higher and whether the shutter sound is appropriate, and outputs the results to the controller 220.

In this embodiment, the sounder monitoring section 214 may include a microphone, and a circuit for performing A/D conversion of sounds received through the microphone, for performing A/D conversion of the amplitude of a sound signal that the controller outputs to the sounder 213, and for obtaining the results, or for detecting an output volume in accordance with digital data that the controller 220 outputs to the sounder 13.

Upon receiving the instruction from the controller 220, the sounder monitor 214 monitors the sounder 213 and determines whether an appropriate sound was generated within a specific period of time for the purpose of "providing notification for a surrounding area of imaging in that vicinity".

When the sounder monitoring section 214 determines that an appropriate sound was not generated within a specified period, the sounder monitoring section 214 transmits to a sounder driver 2201 for the controller 220 an instruction to generate a shutter sound based on basic shutter sound data.

For this embodiment, the following example is employed by the sounder monitoring section 214 as a "determination reference for releasing an adequate shutter sound".

When a sound has a frequency in the audible range and is generated, at a volume of 65 dB or higher, for 0.2 seconds or longer within 0.5 seconds of the start of monitoring (imaging), this sound is determined to be "appropriate".

FIG. 10 is a graph showing an example waveform for a case wherein a shutter sound was generated by the sounder at an adequately high volume.

Figure 11A:
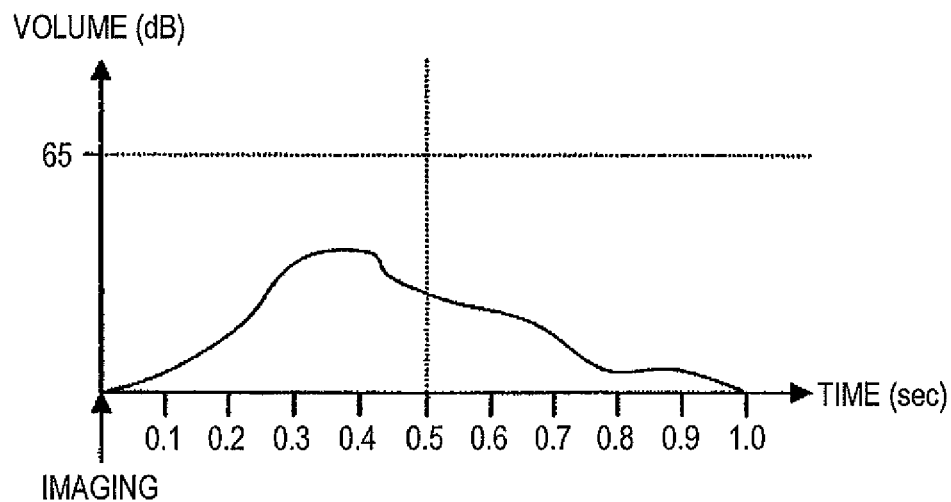
FIGS. 11A and 11B are graphs showing example waveforms for cases wherein a shutter sound was not generated by the sounder at an adequately high volume.
Figure 11B:
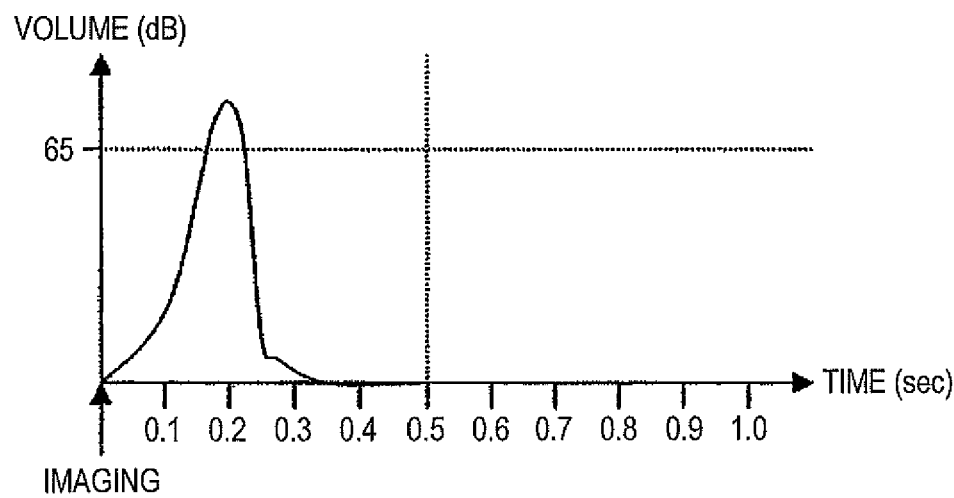

FIGS. 11A and 11B are graphs showing example waveforms for cases wherein a shutter sound was not generated by the sounder at an adequately high volume.

In the example in FIG. 11A, a sound at 65 dB or higher was not generated within 0.5 seconds of the start of monitoring (imaging). In the example in FIG. 11B, a sound at 65 dB or higher was generated for less than 0.2 seconds within 0.5 seconds of the start of monitoring (imaging).

FIG. 12 is a graph showing an example waveform for a case wherein the sounder monitoring section 214 determined, by referring to the determination reference, that an adequate sound was not generated and thereafter issued an instruction to the sounder driver 2201 to generate a shutter sound based on basic shutter sound data, and wherein, in consequence, a basic shutter sound was generated by the sounder.

In other words, in the example in FIG. 12, since the volume of the shutter sound generated by the sounder was inadequate, a basic shutter sound was generated.

The memory 215, which is accessed by the controller 220, includes a shutter sound setup data storage section 2151 for storing shutter sound setup data that can be set by an application that sets a shutter sound or in accordance with data for a shutter sound, and a basic shutter sound data storage section 2152 for storing basic shutter sound data prepared as data for default shutter sound data.

The memory 215 also includes a nonvolatile memory, an EEPROM, in which image data obtained and compressed by the image pickup section 212 are stored.

The display section 216 includes a display device, such as a liquid crystal display device controlled by the controller 220, and displays telephone numbers, a variety of messages and text data entered to perform a communication function.

The display section 216 also displays the image of an object obtained by the image pickup section 212.

The sound output section 217 performs predetermined processing for sound information received from the controller 220, and outputs sound at a loudspeaker.

The sound input section 218 performs predetermined processing for sound collected using a microphone, and transmits the obtained sound information to the controller 220.

The key operating section 219 includes an end (end communication)/power key, a start (call) key, ten key pad, for corresponding numbers, and an imaging key, and when these keys are manipulated by a user, information entered by the user is transmitted to the controller 220.

The controller 220, constituted mainly by a micro computer, controls the entire cellular phone 210 that serves as an image pickup terminal.

The controller 220 provides, for example, control of the radio transmission/reception of a variety of information by the radio communication section 211, of the processing of sound information for the sound output section 217 and the sound input section 218, of the display of information on the display section 216, of the processing performed in consonance with information entered at the key operating section 219, and of access relative to the memory 215.

The controller 220 may have a function for employing the determination obtained by the sounder monitoring section 214 (a shutter sound appropriateness checking function) to inhibit the setup of shutter sound setup data based on an application that sets a shutter sound or data for a shutter sound.

The controller 220 includes a sounder (a shutter sound) driver 2201 for controlling the sounder 213, a camera (photography) driver 2202, a camera (photography) application 2203 for issuing an instruction to the camera driver 2202 and the sounder (the shutter sound) driver 2201, and a forcible shutter sound generation driver for detecting whether the camera (photography) application 2203 has issued an imaging instruction to the camera driver 2202 and for issuing a shutter sound instruction to the sounder (the shutter sound) driver 2201.

After the camera application 2203 of the controller 220 issues an imaging instruction to the camera driver 2202, the camera driver 2202 issues a sounder monitoring instruction to the sounder monitoring section 214.

Upon receiving the instruction, the sounder monitoring section 214 monitors the sounder 213, and determines whether an adequate sound was generated within a specified period for the purpose of "providing notification for the surrounding area of imaging in that vicinity".

When the sounder monitoring section 214 determines that an adequate sound was not generated within the specified period, the sounder monitoring section 214 issues an instruction to the sounder driver 2201 to generate a shutter sound based on a basic shutter sound data. Upon receiving this instruction from the sounder monitoring section 214, the controller 220 accesses the memory 215 and reads the shutter sound setup data, or the basic shutter sound data, and outputs that data to the sounder 213.

The operation of the cellular phone 210 in FIG. 9 will now be explained while referring to FIG. 13.

When the imaging key of the key operating section 219 of the cellular phone 210 in FIG. 9 is manipulated (ST21), and when an imaging instruction is issued, via the camera application 2203 of the controller 220, to the camera driver 2202 (ST22), an instruction for monitoring the sounder 213 is issued to the sounder monitoring section 214 by the camera driver 2202 (ST23). Upon receiving this instruction, the sounder monitoring section 214 monitors, for a specified period of time, sound generated by the sounder 213 (ST24).

Further, the camera driver 2202 provides imaging control for the camera (the image pickup section) 212 (ST25).

Also, a shutter sound release instruction is transmitted by the camera application 2203 to the sounder driver 2201 (ST26). Then, shutter sound setup data is read from the memory 215 (ST27) and, based on the shutter sound setup data, the sounder driver 2201 provides the release control for the sounder 213 (ST28).

Following this, the sounder monitoring section 214 determines whether the sounder 213 generated, within the predetermined specified time, an adequate sound for providing notification for the surrounding area of imaging in that vicinity.

When the sounder monitoring section 214 determines that an adequate sound was not generated within the specified period, the sounder monitoring section 214 issues an instruction to the sounder driver 2201 to generate a shutter sound based on the basic shutter sound data (ST29). Thus, the basic shutter sound data is read from the memory 215 (ST210) and, in accordance with that data, the sounder driver 2201 provides the release control for the sounder 213 (ST211).

According to the second embodiment, the cellular phone 210 has the memory 215 for storing shutter sound setup data that an application can set for the setting of a shutter sound, or in accordance with data for a shutter sound, the notification section (the sounder) 213 for generating a shutter sound based on the shutter sound setup data stored in the memory 215, and the sounder monitoring section 214 for determining whether a shutter sound, generated either by the application for setting the shutter sound or in accordance with the shutter sound data, has a predetermined volume or higher. Therefore, when a determination has been made that the shutter sound was not generated in the predetermined volume or higher based on the determination of the sounder monitoring section 214, a shutter sound is forcibly generated in the predetermined volume or higher. According to this configuration, when an imaging is performed, a shutter sound having an adequately high volume can be generated, so that notification can be provided in an imaging area.

Third Embodiment

Figure 14:
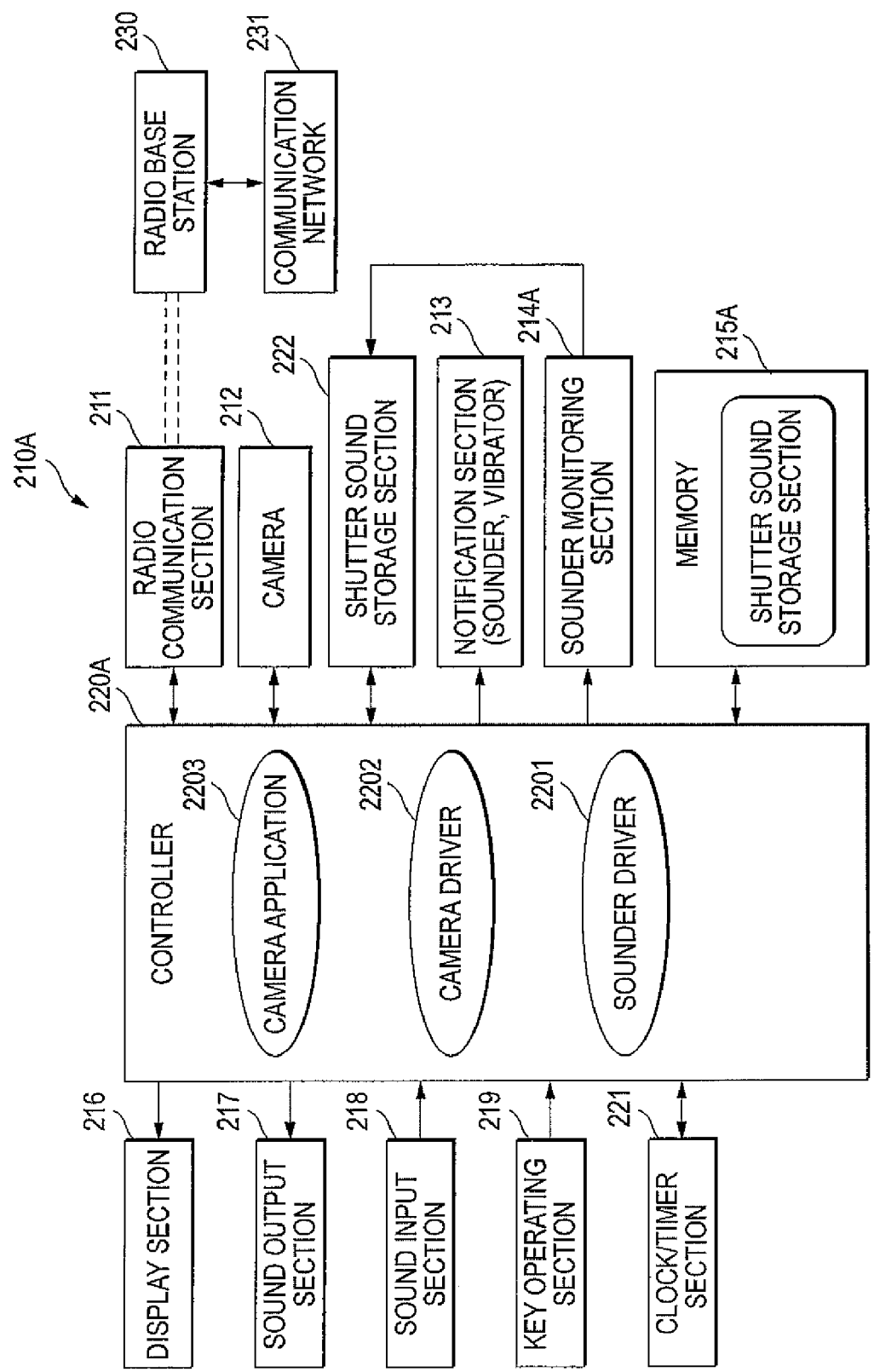
FIG. 14 is a diagram showing the configuration of a cellular phone that employs an image pickup terminal according to a third embodiment of the present invention.

FIG. 14 is a diagram showing the configuration of a cellular phone 210A according to a third embodiment of the present invention.

The third embodiment differs from the second embodiment in that an picked-up image temporary storage section 222 is provided for the temporary storage of photographed image data obtained by a camera 212.

In this embodiment, after a camera application 2203 for a controller 220A issues an imaging instruction to a camera driver 2202, the camera driver 2202 issues a sounder monitoring instruction to a sounder monitoring section 214A.

Upon receiving this instruction, the sounder monitoring section 214A monitors a sounder 213, and determines whether, during a specified period of time, an adequate sound was generated for the purpose of "providing notification for a surrounding area of imaging in that vicinity".

Further, photographed image data obtained by the camera 212 is stored in the photographed image temporary storage section 222 and the reading of this data is inhibited.

When a determination is made that the sounder 213 generated an adequate sound within the specified period, the sounder monitoring section 214A cancels the reading disabled state of the photographed image temporary storage section 222.

When, however, when a determination is made that the sounder 213 did not release an adequate sound within the specified period, the sounder monitoring section 214A deletes the photographed image data stored in the photographed image temporary storage section 222.

FIG. 15 is a diagram for explaining the operation of the cellular phone 210A in FIG. 14.

Figure 13:
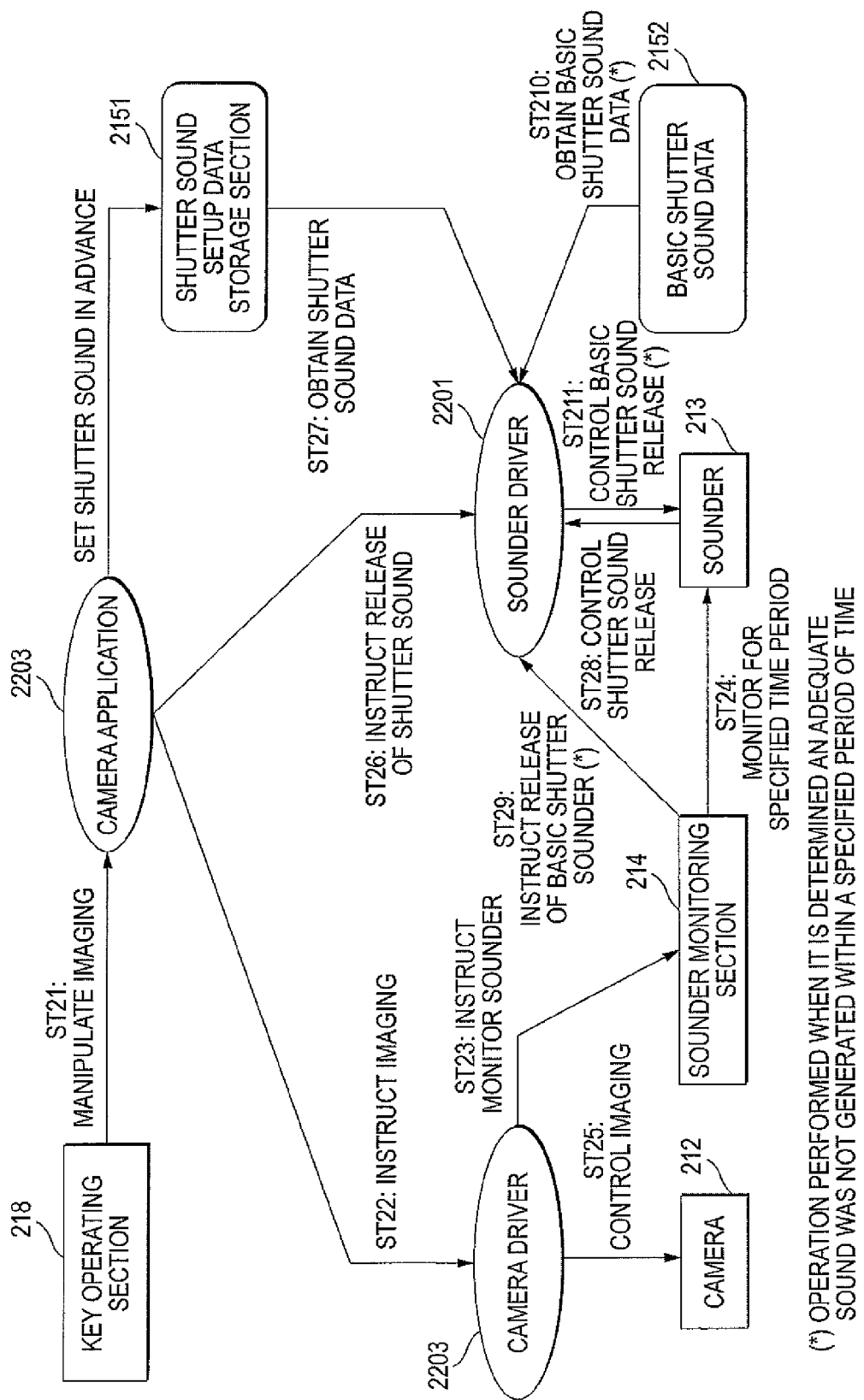
FIG. 13 is a diagram for explaining the operation of the image pickup terminal shown in FIG. 9.

In FIG. 15, the step numbers employed for corresponding processes are the same as those employed in FIG. 13.

When the imaging key of a key operating section 219 of the cellular phone 210A in FIG. 14 is manipulated (ST21) and an imaging instruction is issued, via a camera application 2203 for the controller 220A, to a camera driver 2202 (ST22), an instruction for monitoring the sounder 213 is issued by the camera driver 2202 to the sounder monitoring section 214A (ST23). Upon receiving this instruction, the sounder monitoring section 214A monitors, for a specified period of time, sound generated by the sounder 213 (ST24).

Further, the camera driver 2202 provides the imaging control for the camera (image pickup section) 212 (ST25).

Also, a shutter sound releasing instruction is transmitted by the camera application 2203 to the sounder driver 2201 (ST26). Then, shutter sound setup data is read from the memory 215 (ST27) and, based on the shutter sound setup data, the sounder driver 2201 provides the release control for the sounder 213 (ST28).

Furthermore, photographed image data obtained by the camera 212 is stored in the photographed image temporary storage section 222 and the reading of this data is inhibited (ST212).

When a determination made by the sounder monitoring section 214A is that the sounder 213 generated an adequate sound within a specified period of time, the sounder monitoring section 214A cancels the reading disabled state of the photographed image temporary storage section 222 (ST213).

When, however, a determination made by the sounder monitoring section 214A is that the sounder 213 did not release an adequate sound within a specified period of time, the sounder monitoring section 214A deletes the photographed image data stored in the photographed image temporary storage section 222 (ST213).

The photographed image data stored in the photographed image storage section 222 is read through the camera application 2203 of the controller 220A (ST214). It should be noted that data reading is disabled when reading inhibition is set.

According to the third embodiment, since the photographed image data that is obtained can not be used when an adequate sound is not generated, illegal use of the image data can be prevented.

What is claimed is:

1. An image pickup terminal, comprising:
   an image pickup section;
   a data storage section which stores shutter sound setup data that sets a shutter sound generating when the image pickup section performs an imaging;
   a shutter sound generating section which generates a shutter sound based on the shutter sound setup data stored in the data storage section;
   a shutter sound appropriateness checking section which checks whether a shutter sound based on the shutter sound setup data stored in the data storage section is appropriate or not;

a storage section which temporarily stores image data of an image picked up by the image pickup section; and a control section which controls the shutter sound generating section to generate the shutter sound based on the shutter sound setup data stored in the data storage section when the image pickup section performs an imaging, wherein the control section inhibits the image data stored in the storage section from being read when a shutter sound generated from the shutter sound generating section is inappropriate.

2. The image pickup terminal according to claim 1, wherein the control section deletes the image data stored in the storage section when the shutter sound generated from the shutter sound generating section is inappropriate.

3. The image pickup terminal according to claim 1, wherein the shutter sound appropriateness checking section includes, at the least either a section which detects volume of a shutter sound generated from the shutter sound generating section with using a microphone, or a section which detects amplitude of a digital signal or an analog signal related to the shutter sound generated from the shutter sound generating section.

4. The image pickup terminal according to claim 1, wherein the shutter sound appropriateness checking section determines a shutter sound as being appropriate when the shutter sound generates in predetermined volume or higher for a predetermined period of time or more within a specific period of time following the imaging start.

* * * * *